May 22, 1951 W. P. OEHLER 2,554,205
DIRT GUARD FOR PLANTER RUNNER
Filed Dec. 6, 1944
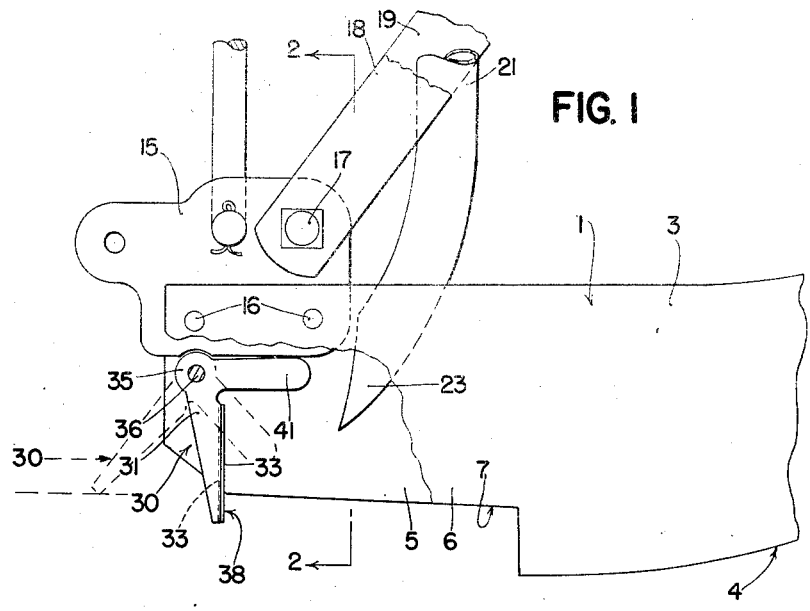
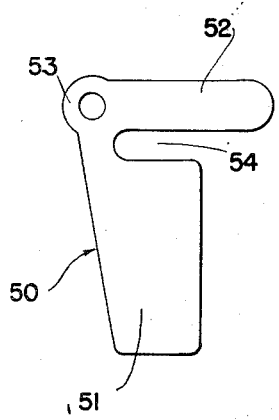
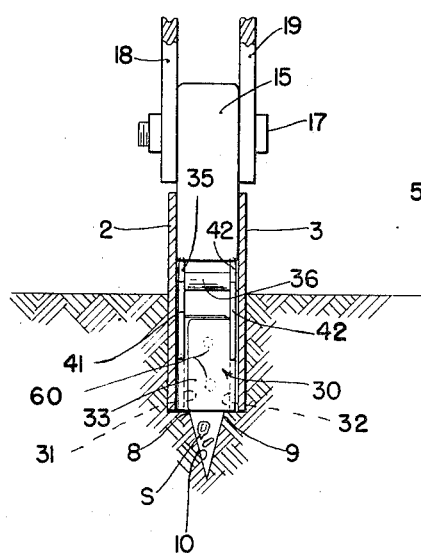
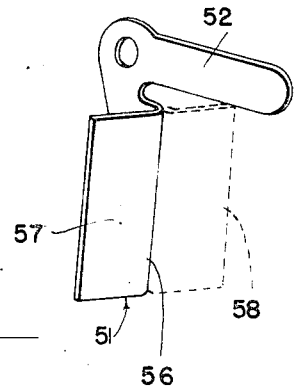
INVENTOR.
WILLIAM P. OEHLER
ATTORNEYS Patented May 22, 1951

2,554,205

UNITED STATES PATENT OFFICE 2,554,205

DIRT GUARD FOR PLANTER RUNNER

William P. Oehler, Moline, Ill., assignor to Deere & Company, Moline, Ill., a corporation of Illinois Application December 6, 1944, Serial No. 566,846

6 Claims. (Cl. 111—85)

The present invention relates generally to agricultural machines and more particularly to planters, particularly planters of the type having runner type openers.

The object and general nature of the present invention is the provision of a furrow opener for planters and their like with special means to prevent soil, trash and the like from clogging the seed passages of the furrow opener. Specifically, it is a feature of this invention to provide a pivoted gate at the rear end of a runner type furrow opener mounted so that in the event the planter should be backed, the gate closes to prevent soil and the like from being forced up into the runner passages, and more particularly it is a feature of this invention to so construct and arrange the pivoted gate that the latter operates along the bottom of the furrow opened by the runner and not along the top of the ground surface, as in prior planters. Still further, it is a feature of this invention to provide a gate for the furrow opener which is inexpensive to construct and assemble and which is equipped with means acting to clear the seed passage of obstructing soil in the event some of the soil becomes plugged or clogged in the seed passage of the runner.

These and other objects and advantages of the present invention will be apparent to those skilled in the art after a consideration of the following detailed description, taken in conjunction with the accompanying drawings in which the preferred form of the invention as been illustrated.

In the drawings:

Figure 1 is a side view of the furrow opener or runner of a planter in which the principles of the present invention have been incorporated.

Figure 2 is a sectional view taken generally along the line 2—2 of Figure 1.

Figures 3 and 4 are views of the blanks from which the gate is formed.

Referring now to the drawings, the reference numeral 1 indicates the furrow opener or runner of a corn planter. The furrow opener 1 is itself generally of conventional construction, incorporating two side plates 2 and 3 suitably secured together from their forward portions to form an upwardly curved seed furrow opening plate 4 and having the rear sections 5 and 6 spaced apart to form a seed passage and of such shape that the rear portions 5 and 6 are offset upwardly, as indicated at 7 in Figure 1, with respect to the cutting edge of furrow opening portion 4 of the runner. Thus, the furrow formed by the furrow opener 1 is, as best shown in Figure 2, of generally V-shaped section having shoulders 8 and 9 on opposite sides of the seed receiving V-shaped furrow section 10. The shoulders 8 and 9 are formed by the rearwardly flaring side sections 5 and 6, particularly the bottom edges 7 thereof. The last mentioned sections are apertured to receive a mounting block 15 to which the runner 1 is connected, as by bolts or rivets 16. The mounting block 15 is also apertured to receive a bolt 17 to which the lower ends of a pair of bars 18 and 19 are connected, these bars forming the principal portion of the shank or standard by which the furrow opener 1 is connected with the frame of the planter. A seed tube 21 receiving seed from seed connecting mechanism (not shown) is secured, as by welding, to one of the shank bars and at its lower end terminates in a curved seed discharge section 23 disposed between the side portions 5 and 6 of the runner adjacent the forward portion of the mounting block 15.

In the normal operation of the planter, as the latter is drawn across the field, each runner 1 opens a seed receiving furrow, such as the one indicated at 8—10 in Figure 2. Seed S directed downwardly and rearwardly by the tube 21 lodges in the narrow V-shaped portion 10 of the furrow. The planter is equipped with suitable covering means (not shown) for filling the furrow with soil after the passage of the seed runner and associated parts.

A dirt guard gate 30 is disposed between the two rear spaced apart portions 5 and 6 of the runner 1 and comprises a pair of side arms 31 and 32 having overlapping portions 33 which are welded together to form a rigid unitary transverse face structure between the main portions of the side arms. The side arms 31 and 32 are extended to form bosses 35 which are apertured to receive a pivot pin or bolt 36 upon which the gate 30 is mounted for rocking movement. As best shown in Figure 1, the gate 30, as indicated at 38, extends downwardly a short distance below the edges 7. The side arms 31 and 32 carry forward arm extensions 41 and 42, and the pivot pin or bolt 36 is carried by the runner plates whereby these arm sections 41 and 42 lie just below the lower face of the mounting block 15. Thus, the arms 41 and 42 prevent the gate 30 from swinging forwardly and upwardly relative to the furrow opener beyond a vertical position of the gate as shown in Figure 1. Thus, in the event the furrow opener should be forced rearwardly, as by inadvertent backing of the implement, or for some other reason, soil cannot be forced into the seed passage space between the two side portions 5 and 6 of the runner, yet in normal operation when the runner is drawn forwardly through the soil, the lower edge portion 38 and the gate 30 rides along the shoulder or wall portions 8 and 9 of the furrow, see Figure 2, but in a position to close forwardly the instant the furrow opener is forced backwardly relative to the ground. The position of the gate 30 in operation is indicated in dotted lines in Figure 1.

The gate 30 has another important function. It sometimes occurs that the runner is dropped suddenly to the ground while the machine is standing still or substantially so. Under certain conditions, this may cause some soil to be forced upwardly into the space adjacent the lower end 23 of the seed tube and between the side portions 5 and 6 of the runner. In the event that this does occur, the gate 30, by virtue of depending downwardly below the edges 7 of the furrow opener, engages the ground so that the moment the runner is drawn forwardly, the gate 30 swings into its dotted line position, the arm sections 41 and 42 swinging downwardly and acting to clear the space adjacent the lower end of the seed tube 21. Thus, the gate 30 serves not only as means to prevent soil from being forced into the seed passages of the runner, as by backing of the implement, inadvertently, or otherwise, but the gate 30 also serves to dislodge any soil that should for some reason tend to become clogged or plugged within the rear end of the runner 1 adjacent the lower end of the seed tube 21.

In Figures 3 and 4 I show a preferred manner in which the gate 30 is formed. Referring first to Figure 3, I provide two blanks 50 where each blank includes a main body portion 51 and an arm portion 52, the apertured section 53 being disposed in line with the arm portion 52, and the latter is separated from the main body portion 51 by a notch 54 that extends from one edge of the main body portion 51 well toward the other edge thereof. The gate is formed by two blanks 50, as just mentioned, one blank being formed as a right hand member while the other blank is formed as a left hand member. To form the right and left hand members, one blank has its main body portion 51 bent, as indicated at 56 in Figure 4. The other blank has its main body portion bent as shown in dotted lines in Figure 4. In other words, the forward portion of the main body section 51 of each blank is bent either in one direction or the other relative to the arm portion 52, thus forming face sections 57 and 58 and the respective right and left hand blanks. It will be understood that Figure 4 shows the right hand blank with the addition of a dotted line showing the manner in which the main body portion of the left hand blank is bent. The right and left hand blanks are then secured together in any suitable manner, as by spot welding the two face portions 57 and 58, as indicated by the reference numeral 60 in Figure 2. One, two or more spot welds may be provided, as desired.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim, therefore, and desire to secure by Letters Patent is:

1. In a planter including a furrow opener having spaced apart portions at the rear end thereof, and seed conduit means having a discharge end disposed between said spaced portions, a gate pivotally mounted between said portions rearwardly of said seed conduit, and laterally spaced apart arm means adjacent said spaced apart portions of the furrow opener and movable with the gate, said arm means projecting toward said seed conduit for dislodging soil from between said portions adjacent said seed conduit.

2. In a planter, a furrow opener runner having rear spaced apart side walls, a dirt guard gate pivoted at the rear of said side walls in depending relation, said gate being disposed within the side walls of the runner and spanning the space therebetween, stop means for limiting the forward swing of the gate member whereby the latter serves to prevent soil being forced into the space between said walls, a pair of arms fixed to said gate on the forward side thereof and extending alongside the inner surfaces of said walls so as to be swung downwardly with respect thereto when said gate is swung rearwardly, the lower portion of said gate being disposed below the lower portions of said walls.

3. In a planter, a runner having at its rear end a pair of vertical laterally spaced wall sections, a gate swingably mounted between said wall sections adjacent the rear edges thereof, said gate being pivoted at its upper end to said wall sections for movement about a generally transverse axis and extending at its lower end downwardly below the lower edges of said wall sections, a member disposed between said wall sections at the upper part thereof and generally forward of said transverse axis, and arm means carried by said gate on the forward side thereof and extending generally forwardly of said transverse axis to engage said member for limiting the forward movement of said gate.

4. In a planter, a runner having at its rear end a pair of vertical laterally spaced wall sections, a gate swingably mounted between said wall sections adjacent the rear edges thereof, said gate being pivoted at its upper end to said wall sections and at its lower end extending downwardly below the lower edges of said wall sections, a member disposed between said wall sections at the upper part thereof, and a pair of arms carried by said gate and extending forwardly thereof adjacent the inner portions of said wall sections, said arms cooperating with said member to limit the forward swinging of said gate and operating when the gate is swung rearwardly to clear said wall sections of soil and the like.

5. For use in planters and the like having furrow opening runners, the improvement which includes a dirt guard gate adapted to be pivotally connected with the rear end of a furrow opening runner, comprising a member having a forwardly facing wall forming a transverse face section, said member being provided with marginal portions bent rearwardly to form flanges, said flanges being extended upwardly above said transverse face section and aperture, forwardly extending arms carried by the upper portions of said flanges, and means extending through the apertures in said upwardly extended portion of said flanges for pivotally connecting said gate to said furrow opening runner.

6. In a planter, a furrow opener adapted to extend generally downwardly and rearwardly and having two laterally spaced apart portions at the rear end thereof, a dirt guard gate disposed at the rear end of said furrow opener, means for pivotally mounting said gate at its upper portion between said spaced apart portions of said furrow opener, whereby said gate serves to prevent the entrance of soil into the rear end of said furrow opener if the planter should be moved rearwardly while said furrow opener is in contact with the ground, and soil-clearing means extending generally forwardly at the upper end of said gate and shiftable generally downwardly and rearwardly within the end of said furrow opener when the latter is moved forwardly through the soil, said soil clearer means serving by virtue of said downward and rearward movement to dislodge any soil forced into the rear end of the furrow opener.

WILLIAM P. OEHLER.

REFERENCES CITED

The following references are of record in the file of this patent:

UNITED STATES PATENTS

| Number | Name | Date |
|---|---|---|
| 611,980 | Smith | Oct. 4, 1898 |
| 789,798 | Deterding | May 16, 1905 |
| 853,256 | Monson | May 14, 1907 |
| 909,137 | Bellerive | Jan. 12, 1909 |
| 1,333,391 | Dodd | Mar. 9, 1920 |
| 1,426,734 | Hendry | Aug. 22, 1922 |
| 1,718,217 | Crawford | June 25, 1929 |
| 1,921,886 | Kriegbaum et al. | Aug. 8, 1933 |

FOREIGN PATENTS

| Number | Country | Date |
|---|---|---|
| 125,720 | Austria | Dec. 10, 1931 |